Nov. 1, 1966   J. P. SHINNICK   3,281,929
APPARATUS FOR ASSEMBLING BELL-AND-SPIGOT PIPING
Filed April 25, 1966

John P. Shinnick
INVENTOR.

BY E.L. Archambeau Jr.
ATTORNEY

United States Patent Office 3,281,929
Patented Nov. 1, 1966

3,281,929
APPARATUS FOR ASSEMBLING BELL-AND-SPIGOT PIPING
John P. Shinnick, Orange, Tex., assignor of one-fourth to Ernest R. Archambeau, Jr., Houston, Tex., and three-eighths to Clyde Granger, Orange, Tex.
Filed Apr. 25, 1966, Ser. No. 544,783
10 Claims. (Cl. 29—237)

This invention relates to apparatus for assembling pipe and fittings; and, more particularly, to new and improved tools for assembling telescoping bell-and-spigot pipe joints and fittings employing elastomeric self-energizing or compression gaskets.

The sewer piping used for most residential and industrial installations today is typically of cast iron, with the various fittings and pipe members being joined by telescopically fitted so-called "bell-and-spigot" connections. Heretofore, these connections have been held together and made fluid-tight by tightly packing a rope-like oakum calking into the annular clearance between the mating members and covering this with molten lead. Although this joining procedure has been successfully employed for many years, the steady rise of material and labor costs has slowly made calked-and-leaded joints too expensive to meet the competition of less suitable arrangements such as solvent-welded plastic pipe.

Accordingly, in one manner of offsetting such rising costs, cast iron bell-and-spigot piping has been modified to use integrally formed elastomeric sleeve-type gaskets for joining and sealing the piping members. These gaskets are suitably proportioned to be snugly fitted into the annular space between the internal surface of the bell of one piping member and the external surface of the plain end of the other piping member.

A typical one of these gaskets is formed with an external peripheral flange on one end that is adapted to engage the outer transverse marginal face of the bell and with another peripheral bead around its intermediate portion that is adapted to be received within an internal circumferential groove provided just inside of the mouth of the bell. The other end of the gasket is provided with a similar external bead or some comparable self-energizing fluid seal that is adapted to be sealingly engaged against the internal surface at the rear of the bell. To complete the fluid seal as well as to firmly secure the plain end of the piping member inserted into the bell, the interior surfaces of the gasket are similarly arranged with one or more internal beads or the like at spaced intervals. Thus, once the plain end of the inserted member is through the gasket and firmly seated against the bell of the other member, the resulting joint is positively sealed at at least two spaced intervals and the members are tightly secured against axial displacements by the radially compressed beads.

To assemble bell-and-spigot piping with such elastomeric gaskets, the gasket is folded and then inserted into the open end of the bell of the first member. After the gasket is positioned, a suitable lubricant is applied inside of the gasket and around the spigot or plain end of the second member. After the members are coaxially aligned, the plain end of the second member is placed into the exposed end of the gasket and forced through the gasket until it is shouldered against the rear internal surface of the bell. Once they are assembled, these gasketed bell-and-spigot joints have proved to be quite successful and are believed to be superior to leaded-and-calked joints.

The assembly of these gasketed joints has been found, however, to require special tools to impart an axial load that may be in the order of a few thousands of pounds on the member being inserted in order to force its plain end through the gasket and against the rear of the bell. Various tools proposed heretofore for this purpose generally employ a spaced pair of pipe-gripping members that are forced toward one another by a levering or jacking action that draws the end of the piping member being inserted into the bell of the other piping member while supposedly keeping the two members in axial alignment.

It has been found, however, that these prior art tools generally fail in one or more respects to meet all of the requirements that might be expected for such tools. For example, with many tools of this nature, a chain or the like must be secured around at least the inserted piping member to anchor or serve as one of the pipe-gripping members of the tool. It will be recognized, however, that a flexible member such as a chain is not always too manageable where the piping installation is closely confined as between structural elements of a building or is lying in the bottom of a narrow ditch. Similarly, many of these tools are not readily adaptable to being repositioned should some eccentricity in the piping members cause them to become mis-aligned as the members are being assembled. Furthermore, some of these tools will inherently tend to shift the piping members out of axial alignment as they are being drawn together.

Perhaps the most significant shortcoming, however, of those tools employed heretofore has been their general inability to accommodate conventional branched bell-and-spigot fittings. For example, to fabricate a typical riser assembly as used in a multistoried building, a number of branched fittings of various sizes and styles must be fitted together in what is usually the minimum possible spacing. The tools now in use, however, require such a wide span between their pipe-gripping members that these tools simply cannot be used to erect a typically close-fitting riser assembly in the most economical manner. This obviously dictates that the installer either resort to the time-honored leaded-and-calked joints or else rearrange the various elements of the riser a sufficient distance apart to permit these jacking or levering tools of the prior art to be used.

It is an object of the present invention, therefore, to provide new and improved tools for assembling or dis-assembling bell-and-spigot piping with gasketed joints, which tools avoid these aforementioned and other disadvantages of the prior art tools and also can be used efficiently in awkward positions as well as in closely confined locations.

This and other objects of the present invention are accomplished by a tool comprising a spaced pair of pipe-engaging means each including a rigid lateral extension substantially parallel to the other, with these extensions being joined to one another by a rigid member therebetween and movably connected to at least one of the extensions. An operating lever is pivotally connected to one of the pipe-engaging means and has connecting means extending therefrom to the other pipe-engaging means.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings, in which:

Figure 1:
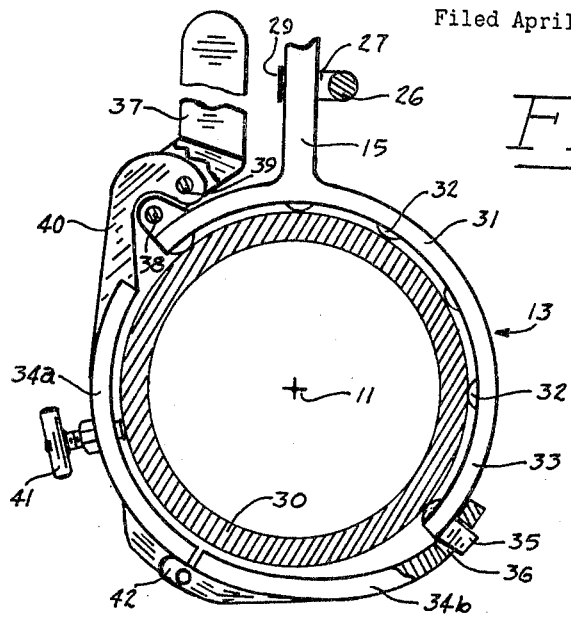
FIG. 1 is an isometric view of one embodiment of a pipe-assembling tool arranged in accordance with the present invention.
Figure 3:
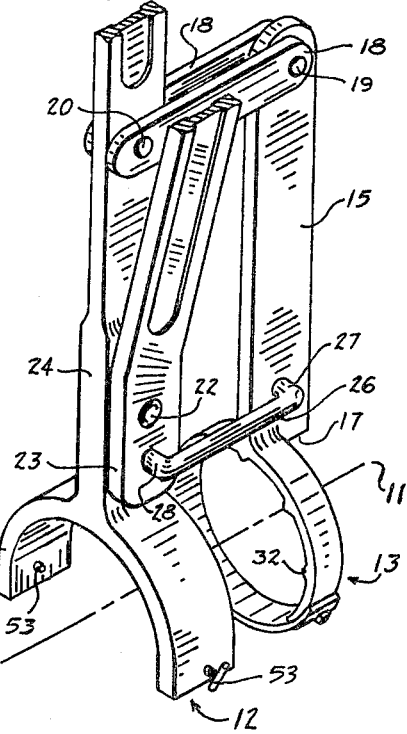
FIG. 3 depicts the tool of FIG. 1 as it is being used to assemble two typical bell-and-spigot piping members.

Turning now to the drawings, one embodiment of a pipe-assembling tool 10 arranged in accordance with the present invention is shown isometrically in FIG. 1 to better illustrate the relative positions of the various components thereof. Although it is apparent that the tool 10 can be employed in any position, for purposes of illustration it is depicted in an upright position in FIG. 1 for operating on piping (not shown) lying generally along a horizontal axis 11. Similarly, although no piping is depicted in FIG. 1 and only one form of bell-and-spigot piping is illustrated in FIG. 3, it will be understood that the terms "piping" and "piping member" as employed herein are intended to include the many various styles of fittings as well as joints of bell-and-spigot piping.

As seen in FIG. 1, the tool 10 is comprised of a spaced pair of pipe-engaging members 12 and 13, with each respectively having an elongated, rigid member 14 and 15 joined thereto and extending laterally therefrom. One of the pipe-engaging members 12 is a generally arcuate or semi-circular rigid yoke adapted to partially embrace the bell of one piping member (not shown). The extension 14 is connected to the middle of the outer surface of the yoke 12 to provide a bifurcated member with its forked ends extending away from the extension. This extension 14 is made somewhat longer than the other extension 15 and is preferably provided with a handle 16 on its free end.

As will subsequently be explained in greater detail with reference to FIG. 2, the other pipe-engaging member 13 is adapted to encircle and be tightly engaged around the plain end of an adjacent coaxially aligned piping member (not shown). The shorter extension 15 is similarly connected to the outer surface of the pipe-engaging member 13 at a convenient point thereon.

For reasons that will subsequently become apparent, a lateral projection or heel 17 is arranged adjacent to the lower end of the extension 15 on the side thereof most distant from the other pipe-engaging member 12. This projecting heel 17 is formed with its lower surface flush with the internal surface of the pipe-engaging member 13 and substantially parallel to the central axis 11 of the piping members (not shown). If desired, this lateral projection 17 can be an integral portion of the fixed end of the shorter extension 15 by forming at least the lower end of this extension of a greater width than that of the pipe-engaging member 13.

To maintain the pipe-engaging members 12 and 13 cooperatively aligned and their respective extensions 14 and 15 substantially parallel to one another, means, such as a spaced pair of rigid links 18 on opposite sides of the extensions, movably interconnect the two extensions to one another. These links 18 are pivotally connected at each end thereof by transverse pivot pins 19 and 20 respectively to the free end of the shorter extension 15 and an intermediate point on the longer extension 14.

An elongated operating lever 21 is pivotally connected, as by a transverse pivot pin 22, near its lower end 23 to the longer extension at a point between the intermediate pivot 20 and the junction of the extension 14 with the yoke 12. To provide sufficient spatial clearance between the opposed surfaces of the operating lever 21 and the nearest one of the rigid links 18, the lower portion of the longer extension 14 may be made thicker, as at 24. Although the operating lever 21 can, of course, be made substantially straight, it is found to facilitate the operation of the tool 10 by slightly offsetting the lower end 23 of the lever with respect to the longitudinal axis of its major portion. If this is done, the lever 21 is mounted as illustrated with its offset end 23 being directed downwardly toward the yoke 12 and the major portion of the lever being extended upwardly away from the longer extension 14 and diagonally across the rigid links 18 and shorter extension 15. If desired, the upper end of the operating lever 21 can be furnished with a handle 25.

To draw the pipe-engaging members 12 and 13 in a substantially rectilinear path toward one another in response to movement of the operating lever 21, force-transmitting means, such as a link or rod 26, are operatively connected between the offset lever end 23 and the fixed end of the shorter extension 15 a short distance above its junction with the pipe-engaging member 13. By forming the connecting rod 26 with short, offset end portions 27 and 28 at right angles to the rod and loosely disposing these end portions in complementary transverse holes formed in the operating lever 21 and shorter extension 15, the rod is free to pivot relative to each of these members but still effectively transmit forces in either direction. If desired, insert sleeves (not shown) may be disposed in each of these transverse holes to reduce the friction between the relatively moving parts. To secure the connecting rod 26 at each of its ends, the offset ends 27 and 28 of the rod may be pinned or upset, as at 29 (FIG. 2), after it has been installed. It will be appreciated, of course, that the difference in distances between pivots 22 and 28 and between pivot 22 and the handle 25 will provide a substantial mechanical advantage.

By offsetting the lever portion 23 as shown, it will be recognized that the connecting rod 26 will remain substantially parallel to the central axis 11 of the piping members as the lever 21 is operated. This will permit most, if not all, of the forces being applied through the lever 21 to be directed more effectively toward pulling the pipe-engaging member 13 in a substantially axial direction rather than pulling it somewhat upwardly and away from the central axis 11.

It will be noted from FIG. 1 that, with the tool 10 in the position depicted there, the two upright extensions 14 and 15 will be substantially parallel to one another and spaced apart a distance determined by the lengths of the rigid links 18 and the connecting rod 26. It should be understood, however, that because of the difference between the outside diameters of the bell and plain ends of the piping members (not shown) on which the pipe-engaging members 12 and 13 respectively rest, the shorter extension 15 should extend slightly further downwardly than the longer extension 14 to position the pipe-engaging members in coincidental alignment along the central axis 11.

It will be appreciated that since the various elements of the tool 10 will be subjected to severe bending and perhaps torsional stresses during its operation, these elements must be appropriately designed. Accordingly, although it is preferred to integrally form the tool 10 from various forgings or castings as depicted, it is certainly within the scope of the present invention to vary such particular constructional details. For example, a satisfactory tool could also be fabricated from various straps or bars of sufficient strength and fastened together as required. Similarly, the lever 21 could be bifurcated and disposed on opposite sides of the extension 14, with the free ends of its forked portion being respectively pivoted on the pin 22.

As already mentioned, it may require an axial load of a few thousands of pounds to force the plain end of a piping member into the bell of an adjacent piping member. This makes it necessary, of course, that the pipe-engaging member 13 be tightly secured around the plain end of that piping member.

Figure 2:
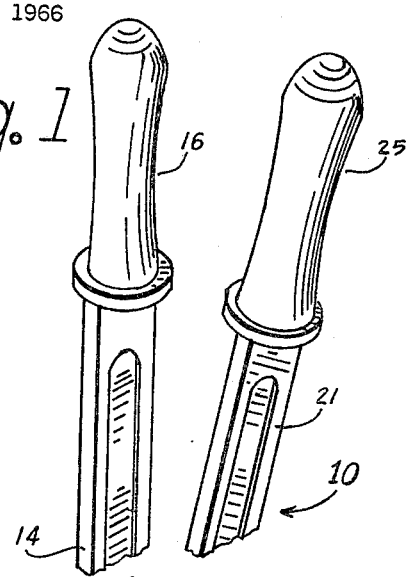
FIG. 2 is an elevational view of a preferred embodiment of an adjustable pipe-engaging member for the tool of FIG. 1.
Figure 2:
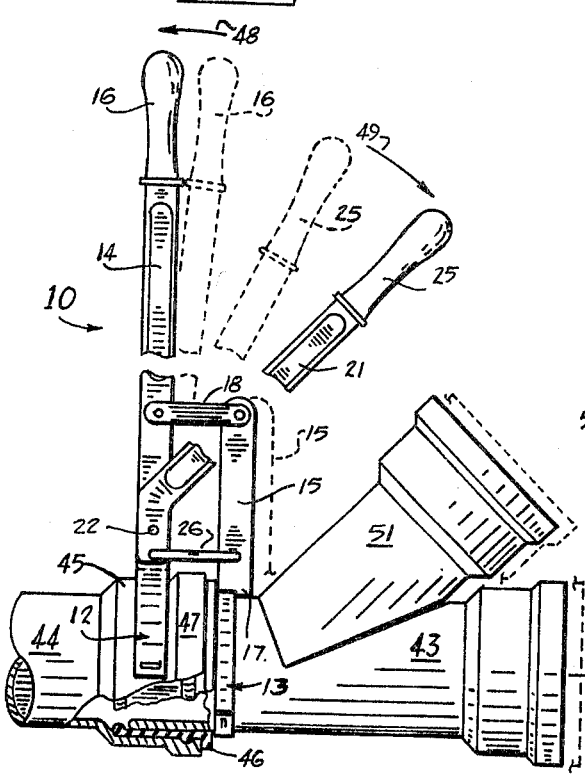

Accordingly, a preferred embodiment of such a pipe-engaging member 13 is shown in FIG. 2 which not only tightly embraces the plain end of a piping member 30 but is also adapted to accommodate dimensional variations in the external diameters of whatever particular size of piping for which the tool 10 is designed to fit. Moreover, the pipe-engaging member 13 is particularly arranged to be readily positioned around the piping member 30 and be quickly secured thereto with a minimum of effort.

To accomplish these functions, the pipe-engaging member 13 is comprised of a rigid, arcuate or substantially semi-circular member 31 that is secured to or made integral with the lower end of the shorter extension 15. Although the extension 15 may be connected to the arcuate member 31 at the center of its outer periphery, for ease in positioning the tool 10, it is preferred to angularly offset the extension relative to the arcuate member somewhat as shown in FIG. 2.

If desired, a plurality of inwardly directed teeth 32 may be formed around the inner perimeter of the arcuate member 31 to ensure that the pipe-engaging member 13 will not slip along the surface of the piping member 30 as, for example, where it is coated with asphalt or the like. Although these teeth 32 may be integrally formed with the arcuate member 31, it is preferred to form these teeth with such hard-facing materials as tungsten carbide, stellite, or the like. It is also advantageous to form these teeth 32 immediately adjacent to the transverse face 33 of the arcuate member 31 most proximate to the other pipe-engaging member 12. In this manner, should the teeth 32 become dulled or broken during use, their flat forward faces may be filed or ground by passing a sharpening tool (not shown) along the transverse face 33 of the arcuate member 13. It should be noted in passing that, although not shown, teeth could be similarly employed on the yoke 12.

To secure the upper arcuate member 31 to the piping member 30, an oppositely directed second arcuate member 34 is releasably secured to either or both of the opposite ends of the other member 31 to complete the encirclement of the piping member. Detachable connecting means, such as an outwardly directed projection 35 from one end of the upper arcuate member 31 cooperatively received in a slot 36 on the end of the lower arcuate member 34, releasably connect these opposed ends of the arcuate members. At the other opposed ends of the two arcuate members, a bifurcated lever 37 itself pivotally mounted, as at 38, to the outer surface of the upper arcuate member 31 is pivotally connected, as at 39, to the opposite sides of the free end of a curved toggle link 40 that is in turn secured at its other end to the adjacent end of the lower arcuate member 34. By appropriately arranging the pivots 38 and 39 relative to one another, the bifurcated lever 37 will act as a toggle linking means when it is thrown into the position depicted in FIG. 2.

Accordingly, it will be appreciated from FIG. 2 that one end of the lower arcuate member 34 is pivotally connected through the bifurcated toggle lever 37 to the adjacent end of the upper arcuate member 31. The other opposed ends of the arcuate members 31 and 34 are detachably secured to one another by the complementarily fitting projection 35 and slot 36. Thus, once the upper arcuate member 31 is positioned over the piping member 30, the lower arcuate member 34 can be pivoted on around the underside of the piping member and its free end connected to the other end of the upper arcuate member by the complementary fit of the projection 35 into the slot 36.

Those skilled in the art will appreciate that all piping members of a particular size of piping do not always have the same outside diameter. Thus, were the pivots 38 and 39 spaced apart a particular distance on the bifurcated toggle lever 37 to accommodate one diameter of a piping member, as at 30, it might not always be possible to securely grip the piping member as the toggling lever 37 is moved into its upright position as seen in FIG. 2. Accordingly, to accommodate varying outer diameters of piping members, adjusting means, such as an inwardly directed screw 41, are provided on the lower arcuate member 34. In this manner, where the diameter of the piping member 30 is greater or less than that shown, the adjusting screw can be appropriately positioned to permit the two arcuate members 31 and 34 to be tightly drawn around the piping member when the bifurcated toggle lever 37 has reached its most effective toggling position.

As further convenience in the operation of the tool 10, it has been found of benefit to divide the lower arcuate member 34 as shown in FIG. 2 and pivotally connect its two portions 34a and 34b together as by a hinge 42. With the two portions 34a and 34b of the arcuate member 34 hingedly connected together in this manner, when the lower arcuate member is being passed around, for example, the underside of a piping member lying in a ditch, the added freedom of motion provided by the hinge 42 has been found to greatly facilitate the introduction of the projection 35 into the slot 36.

Turning now to the operation of the tool 10. In FIG. 3, the tool 10 is depicted as it might appear when being used to assemble a fitting, such as a branched "Y" 43, to another piping member 44. As previously mentioned, the plain end of the Y 43 is suitably proportioned to be inserted into the bell 45 of the adjacent piping member 44. An elastomeric gasket 46 is previously positioned into the open mouth of the bell 45 and the plain or spigot end of the Y 43 is forced into the gasket as the tool 10 is operated. In the particular position of the piping members 43 and 44 depicted in FIG. 3, the tool 10 has already pulled the Y 43 from a previous position (shown in dotted lines) to the position shown there in solid lines. At this point, the plain end of the Y 43 is now substantially through the gasket 46 and needs perhaps only another thrust by the tool 10 before it is firmly seated against the inner surface at the rear of the bell 45.

To pull the Y 43 from its dotted-line position to the full-line position shown in FIG. 3, the yoke 12 is firmly seated behind and abutted against the external flange 47 of the bell 45. The pipe-engaging member 13 is fitted around the plain end of the Y 43 and secured thereto. Then, with the extensions 14 and 15 in their respective positions as generally illustrated by the dotted lines in FIG. 3, the handles 16 and 25 are forced apart in the directions respectively shown by the arrows 48 and 49.

As the handles 16 and 25 are forced apart, it will be noted that the shorter extension 15 will remain substantially upright. It will in effect be drawn longitudinally toward the other extension 14 by the connecting rod 26. It should be noted that the rigid links 18 may be initially inclined from their horizontal position (as depicted in the drawings) by virtue of the inclination of the longer extension 14 and the pivots 19 and 20 of the rigid links.

With the tool 10 in the dotted-line position depicted in FIG. 3, and, in particular with the longer extension 14 in the perhaps somewhat slightly exaggerated position indicated thereby, movement of the longer extension in the direction indicated by the arrow 48 will assist in keeping the shorter extension 15 substantially upright as it pivots slightly about pivot 19. It will also be noted that the tendency of the extension 15 to pivot about its connection 19 will impose a downward force through the heel 17 against the upper surface of the Y 43 to assist in keeping it in axial alignment with the other piping member 44.

The maintenance of the shorter extension 15 in a substantially upright position is of significance. With the extension 15 maintained perpendicular to the central axis 50 of the piping members 43 and 44, the underside of the heel 17 will be firmly engaged against the upper surface of the Y 43. Thus, the natural tendency of the free end of the Y 43 to tip upwardly (counterclockwise in FIG. 3) by virtue of the moment force created by the offset of the connecting rod 26 from the center line 50 of the piping will be resisted by the engagement of the heel 17 with the Y. It has been found that the heel 17 will provide the operator with a positive control over the piping members 43 and 44 to keep the piping members in axial alignment as they are being drawn together. Similarly, the rigid links 18 serve to hold the free end of the shorter extension 15 away from the other extension 14 to allow the shorter extension to pivot at 19 rather than having its upper end come over toward the longer extension. It has also been found that by employing two links at 18, torsion of the longer extension 14 will be substantially reduced as the tool 10 is being operated.

It should be particularly noted that the close spacing of the extensions 14 and 15 as well as the relatively narrow width of each of the pipe-engaging members 12 and 13 will permit the tool 10 to be operated to draw together two piping members of even such close spacing as those shown in FIG. 3. It will also be recognized that rather than being impeded, as for example, by the branch 51 of the Y 43 as would tools of the prior art, the pipe-engaging member 13 of the tool 10 can be fitted over the exposed plain end of the Y without interference. It will be realized, of course, that in some instances, however, it may be necessary to angularly displace the tool 10 slightly relative to the central axis of the branch 51 of the Y 43 to permit the heel 17 to remain against the piping member. By this, it is meant that the tool 10 may have to be rotated about the axis 50 away from or toward the viewer in FIG. 3 to permit the heel 17 to clear the junction of the branch 51 with the main portion of the Y 43. This tilting or displacement of the tool 10 is not objectionable, however, inasmuch as it will not prevent the fastening of the pipe-engaging member 13 around the piping member 43 or interfere with the operation of the tool.

Those skilled in the art will recognize that it is sometimes necessary to separate one piping member from another after they have been joined. For example, an error in measurement or an inadvertent failure to put a particular fitting at a desired point may sometimes make it necessary to disassemble at least part of a piping installation to correct the mistake.

Accordingly, to employ the tool 10 of the present invention for disassembling bell-and-spigot piping, it is necessary only to position the pipe-engaging members 12 and 13 so that each is around the plain end of, for example, the Y 43. The yoke 12 will be moved from on top of the bell 45 as shown in FIG. 3 to about the position illustrated there for the other pipe-engaging member 13. The pipe-engaging member 13 is, of course, moved away slightly (to the right as viewed in FIG. 3) from the yoke 12 as required. Then, with the tool 10 in about the same general position shown in full-line in FIG. 3, the handles 16 and 25 are forced together in the opposite directions of those indicated by arrows 48 and 49 toward their dotted-line positions.

In this disassembling operation, the connecting rod 26 is used to push the shorter extension 15 away from rather than to pull it toward the pipe-engaging member 12. Moreover, in this operation, the outer face 52 of the yoke 12 is pushed against the marginal face of either the bell 45 or the exposed portion of the gasket 46 to force the piping member 44 off of the other piping member 43.

In some instances, bell-and-spigot piping is fabricated without the peripheral flange around the bell being too pronounced. In such instances, it may be difficult for the yoke 12 to gain purchase with the rear face of this peripheral bell flange, as at 47, when the piping members 43 and 44 are being jointed. To facilitate the use of the tool 10 in such instances, the lower extremities of the yoke 12 are equipped with opposed, inwardly directed adjustable screws 53 which can be moved inwardly into point contact with the opposite sides of the bell 45 a slight distance below the central axis 50 thereof. Thus, when the tool 10 is operated as shown in FIG. 3, the engagement point of the yoke 12 with the member 44 will be through the screws 53 rather than against the rear face of the peripheral flange 47 on the bell 45. By putting the contact points of the screws 53 below the central axis 50, the yoke 12 can not be lifted off of the piping member 44 as the tool 10 is operated. Otherwise, the operation of the tool 10 will remain the same.

It will be understood that the rigid links 18 could be secured at one end or the other rather than being pivotally mounted at both ends as by the pivots 19 and 20. If, for example, the rigid links 18 are secured to the free end of the shorter extension 15 rather than being pivoted thereto by the pin 19, the shorter extension would instead pivot about the pivot 20. Since this hampers the freedom of operation of the tool 10, however, it is preferred to leave both ends of the rigid links 18 pivoted as illustrated. In this manner, the tool 10 is more readily engaged and disengaged from the piping members 43 and 44 since it would otherwise be somewhat awkward to fit the open ends of the members 12 and 13 over their respective piping members. Similarly, where the tool 10 must be moved through several manipulations to couple two piping members, repositioning of the tool is greatly facilitated where it has the ability for the pipe-engaging member 12 to be picked straight upwardly and off at the piping member 44 without disconnecting the pipe-engaging member 13.

When the tool 10 is being operated, it will be appreciated that the pipe-engaging member 12 will in effect pivot about the pivot 20 and the pipe-engaging member 13 will in effect pivot about the pivot 10. Depending upon which piping member 43 or 44 is being held stationary while the other is moved, one or the other of the pipe-engaging members 12 and 13 will tend to pivot while the other remains essentially stationary. It is possible, of course, that both of the pipe-engaging members 12 and 13 might pivot simultaneously to bring both of the piping members 43 and 44 toward or away from one another.

Accordingly, by separating the pivots 19 and 20 a substantial distance from the pivots 22 and 27, the arcs through which the pipe-engaging members 12 and 13 will traverse will be considerably flatter than would be the case were these pivot points much closer. Thus, the further out these pivot points 19 and 20 are, the more nearly the arcs of the pipe-engaging members 12 and 13 will approach a straight line and the easier it will be to maintain the piping members 43 and 44 in axial alignment as they are being joined.

Accordingly, it will be appreciated that the tool 10 of the present invention will now permit telescoping bell-and-spigot pipe joints and fittings employing elastomeric self-energizing or compression-type gaskets to be joined together in a more expeditious manner than has been heretofore possible with the tools of the prior art. The tool 10 can be fitted over closely coupled piping members that can not be successfully engaged by the widely spaced pipe-gripping members of the prior art tools. Moreover, despite the tendency of the piping member being inserted to be deflected away from the central axis of the piping members as they are being joined, the heel 17 at the base of the shorter extension member 15 will prevent the inserted member from being canted or tilted. Furthermore, the tool 10 is suitably arranged for use in closely confined locations and can be operated in any position. It is simple enough and sufficiently light that it can easily be held over the head of the operator to permit its use on overhead piping installations. Similarly, the tool 10 is appropriately arranged to permit its re-positioning quickly and with no difficulty should it be necessary to disassemble one fitting from another.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A tool for assembling or disassembling piping members respectively having a female or bell end adapted to receive the male or spigot end of the other and comprising: first and second pipe-engaging means spaced apart from one another and each including rigid extension means extending laterally therefrom and substantially parallel to one another, one of said pipe-engaging means having a portion adapted to abuttingly engage the bell end of a piping member; means adapted for releasably securing the other of said pipe-engaging means to the spigot end of a piping member to be introduced or removed from the bell of the first-mentioned piping member; linkage means pivotally interconnecting one of said extension means to an intermediate position on the other of said extension means for holding said one extension means spaced from said intermediate position; lever means pivotally mounted to said first pipe-engaging means; and force-transmitting means interconnecting said lever means to said second pipe-engaging means.

2. The tool of claim 1 wherein said linkage means includes a rigid member pivotally mounted near at least one end thereof to said first extension means.

3. The tool of claim 1 wherein said extension means are normally substantially perpendicular to the central axis of the piping members and said linkage means are normally substantially parallel to said central axis.

4. The tool of claim 3 wherein said linkage means includes a rigid member pivotally mounted near at least one end thereof to said first extension means.

5. The tool of claim 1 wherein said other pipe-engaging means includes a first arcuate member connected to its associated extension means and having free ends adapted to partially embrace the upper portion of the spigot end of the second-mentioned piping member; and wherein said releasable securing means includes a second arcuate member opposed to said first arcuate member and partially embracing the lower portion of the aforementioned spigot end, means movably connecting one of said free ends to one end of said second arcuate member, and means for drawing the opposed other ends of said arcuate members toward one another for circumferentially gripping the aforementioned spigot end.

6. The tool of claim 5 further including means on said other pipe-engaging means adapted to engage the aforementioned spigot end to prevent lateral movement of the second-mentioned piping member away from its central axis.

7. The tool of claim 5 wherein said second arcuate member is comprised of two separate portions and means pivotally connecting said separate portions; and further including adjusting means movably mounted on one of said separate portions and adapted for lateral movement relative thereto against the aforementioned spigot end.

8. The tool of claim 5 further including gripping means around the interior surface of said first arcuate member adapted for embedment into the aforementioned spigot end.

9. The tool of claim 8 wherein said second arcuate member is comprised of two separate portions and means pivotally connecting said separate portions; and further including adjusting means movably mounted on one of said separate portions and adapted for lateral movement relative thereto against the aforementioned spigot end.

10. The tool of claim 9 wherein said extension means are normally substantially perpendicular to the central axis of the piping members and said rigid member is also pivotally mounted near the other end thereof to the extension means adjacent thereto so as to normally be substantially parallel to said central axis.

References Cited by the Examiner
UNITED STATES PATENTS

| | | | |
|---|---|---|---|
| 2,958,125 | 11/1960 | Nichols | 29—237 |
| 3,096,572 | 7/1963 | Simmons | 29—237 |

References Cited by the Applicant
UNITED STATES PATENTS

| | | |
|---|---|---|
| 947,837 | 2/1910 | Miller. |

FOREIGN PATENTS

| | | |
|---|---|---|
| 1,119,300 | 4/1956 | France. |

WILLIAM FELDMAN, *Primary Examiner.*

J. C. PETERS, *Assistant Examiner.*